(12) United States Patent
B'Far et al.

(10) Patent No.: US 9,081,953 B2
(45) Date of Patent: Jul. 14, 2015

(54) DEFENSE AGAINST SEARCH ENGINE TRACKING

(75) Inventors: Reza B'Far, Huntington Beach, CA (US); Kent Spaulding, Portland, OR (US); Patrick Crane, Mission Viejo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 123 days.

(21) Appl. No.: 13/551,553

(22) Filed: Jul. 17, 2012

(65) Prior Publication Data

US 2014/0026221 A1    Jan. 23, 2014

(51) Int. Cl.
| G06F 7/04 | (2006.01) |
| G06F 17/30 | (2006.01) |
| H04N 7/16 | (2011.01) |
| G06F 21/50 | (2013.01) |
| G06F 21/62 | (2013.01) |
| H04L 29/06 | (2006.01) |

(52) U.S. Cl.
CPC .......... *G06F 21/50* (2013.01); *G06F 17/30395* (2013.01); *G06F 17/30646* (2013.01); *G06F 21/6254* (2013.01); *G06F 21/6263* (2013.01); *H04L 29/06639* (2013.01); *H04L 63/0421* (2013.01)

(58) Field of Classification Search
CPC ............ G06F 21/6254; G06F 21/6263; G06F 17/30395; G06F 17/30646; H04L 63/0421; H04L 29/06639
USPC .......................................................... 726/26
See application file for complete search history.

(56) References Cited

U.S. PATENT DOCUMENTS 4,004,089 A    1/1977   Richard et al.
(Continued)

FOREIGN PATENT DOCUMENTS

EP    1 586 976 A2    10/2005
EP    1 865 651 A1    12/2007
(Continued)

OTHER PUBLICATIONS

Howe et al, "Trackmenot: Resisting Surveillance in Web Search", Lessons from the Identity Trail: Anonymity, Privacy, and Identity in a Networked Society, 2009.*
Shapira et al, "PRAW—A Privacy Model for the Web". Wiley Periodicals, Inc. Nov. 5, 2004. pp. 159-172. http://onlinelibrary.wiley.com/doi/10.1002/asi.20107/pdf.*

(Continued)

*Primary Examiner* — Linglan Edwards
*Assistant Examiner* — Forrest Carey
(74) *Attorney, Agent, or Firm* — Kilpatrick Townsend and Stockton LLP

(57) ABSTRACT

Techniques for enhancing electronic privacy utilize noise to prevent third parties from determining certain information based on search queries. Users submit search queries as part of their normal activities. For a user, the search queries submitted and information regarding search results used to generate additional search queries on different, but related topics. The generated additional search queries are submitted automatically on behalf of the user at a sufficient frequency to prevent high accuracy data analysis on search queries.

18 Claims, 9 Drawing Sheets

(56) References Cited

U.S. PATENT DOCUMENTS

| | | | |
|---|---|---|---|
| 5,365,589 A | 11/1994 | Gutowitz | |
| 5,535,393 A | 7/1996 | Reeve et al. | |
| 5,787,175 A | 7/1998 | Carter | |
| 5,933,503 A | 8/1999 | Schell et al. | |
| 6,243,480 B1 | 6/2001 | Zhao et al. | |
| 6,282,650 B1 | 8/2001 | Davis | |
| 6,377,987 B1 | 4/2002 | Kracht | |
| 6,446,093 B2 | 9/2002 | Tabuchi | |
| 6,708,272 B1 | 3/2004 | McCown et al. | |
| 6,963,971 B1 | 11/2005 | Bush et al. | |
| 6,976,166 B2 | 12/2005 | Herley et al. | |
| 6,986,046 B1 | 1/2006 | Tuvell et al. | |
| 7,190,790 B1 | 3/2007 | Hill et al. | |
| 7,243,345 B2 | 7/2007 | Ohsawa et al. | |
| 7,313,601 B2 | 12/2007 | Fischer et al. | |
| 7,318,092 B2 | 1/2008 | Sutler | |
| 7,363,369 B2 | 4/2008 | Banerjee et al. | |
| 7,940,926 B2 | 5/2011 | Thomas | |
| 2002/0003886 A1 | 1/2002 | Hillegass et al. | |
| 2002/0103806 A1* | 8/2002 | Yamanoue | 707/100 |
| 2002/0108035 A1 | 8/2002 | Herley et al. | |
| 2002/0118836 A1 | 8/2002 | Howard et al. | |
| 2002/0138504 A1 | 9/2002 | Yano et al. | |
| 2003/0009533 A1 | 1/2003 | Shuster | |
| 2003/0009553 A1 | 1/2003 | Benfield et al. | |
| 2003/0034905 A1 | 2/2003 | Anton et al. | |
| 2003/0088650 A1 | 5/2003 | Fassold et al. | |
| 2004/0141613 A1 | 7/2004 | Hayashi | |
| 2004/0145661 A1 | 7/2004 | Murakami et al. | |
| 2004/0193871 A1 | 9/2004 | Seshadri | |
| 2006/0050880 A1 | 3/2006 | Taylor et al. | |
| 2006/0123029 A1 | 6/2006 | LeTourneau | |
| 2006/0143350 A1 | 6/2006 | Miloushev et al. | |
| 2008/0019505 A1 | 1/2008 | Thomas | |
| 2008/0091661 A1* | 4/2008 | Plow et al. | 707/3 |
| 2009/0070773 A1 | 3/2009 | Depoutovitch et al. | |
| 2010/0161783 A1 | 6/2010 | Komine | |
| 2010/0169294 A1* | 7/2010 | Gerber | 707/706 |
| 2011/0113038 A1 | 5/2011 | Corbin et al. | |
| 2011/0119253 A1* | 5/2011 | Grabarnik et al. | 707/722 |
| 2011/0158400 A1 | 6/2011 | Thomas | |
| 2012/0246165 A1* | 9/2012 | Batraski et al. | 707/740 |

FOREIGN PATENT DOCUMENTS

| | | |
|---|---|---|
| WO | 02/01271 A1 | 1/2002 |
| WO | 2009/033248 A1 | 3/2009 |

OTHER PUBLICATIONS

Huerta, David, "Search History Privacy Though Obfuscation: Introducing the Haystack Project," (Jan. 9, 2009), retrieved from http://haystackproject.org/whitepaper.pdf, on Jul. 17, 2012.

Howe, Daniel C., et al., "TrackMeNot," retrieved from http://cs.nyu.edu/trackmenot/, on Jul. 17, 2012.

Anonymous, Cryptographic Protocol Building Blocks [online]. Sep. 7, 1999, 6 Pages.

Anonymous, How to: Use a Thread Pool (C# Programming Guide). [online]. Microsoft Corporation, Dec. 31, 2005 [retrieved on May 6, 2013]. Retrieved from the Internet: <URL: http://msdn.microsoft.com/en-us/library/3dasc8as(VS.80).aspx>.

Merkle, et al., On the security of multiple encryption. Departement of Communications of the ACM, [Online]. vol. 24, No. 7, XP002446598, Jul. 1981, pp. 465-467.

Oaks et al., *Java Threads: Understanding and Mastering Threaded Programming*. 2nd Edition. O'Reilly Media, 1999.

U.S. Appl. No. 11/449,494, Non-Final Office Action mailed on Feb. 2, 2010, 25 Pages.

U.S. Appl. No. 11/449,494, Non-Final Office Action mailed on Aug. 18, 2010, 26 Pages.

U.S. Appl. No. 11/449,494, Notice of Allowance mailed on Jan. 26, 2011, 13 Pages.

U.S. Appl. No. 12/207,648, Non-Final Office Action mailed on Nov. 28, 2011, 15 Pages.

U.S. Appl. No. 12/207,648, Final Office Action Received mailed on Jul. 19, 2012, 16 Pages.

U.S. Appl. No. 13/040,584, Non-Final Office Action mailed on Jan. 4, 2013, 26 Pages.

International Application No. PCT/CA2007/001588, International Preliminary Report on Patentability mailed on Mar. 16, 2010, 4 Pages.

International Application No. PCT/CA2007/001588, Written Opinion and International Search Report mailed on Jun. 13, 2008, 5 Pages.

U.S. Appl. No. 13/040,584 , "Final Office Action", Jul. 16, 2013, 24 pages.

U.S. Appl. No. 13/040,584 , "Notice of Allowance", Oct. 17, 2013, 8 pages.

Howe, Daniel C. and Helen Nissenbaum, "TrackMeNot: Resisting Surveillance in Web Search." in Kerr et al., *Lessons from the Identity Trail: Anonymity, Privacy and Identity in a Networked Society* (2009), pp. 417-436.

PCT/US2013/049975 , "International Search Report and Written Opinion", Dec. 6, 2013, 9 pages.

* cited by examiner

| Search Query | Execution Time |
|---|---|
| https://www.search.example.com/search?q=oregon+ducks&rls=com.microsoft:en-us&ie=UTF-8&oe=UTF-8&startIndex=&startPage=1 | 2012-05-05T09:02:13 |
| https://www.search.example.com/search?q=oregon+state+beavers&rls=com.microsoft:en-us&ie=UTF-8&oe=UTF-8&startIndex=&startPage=1 | 2012-05-05T09:15:22 |
| https://www.search.example.com/search?q=college+football+clothing&rls=com.microsoft:en-us&ie=UTF-8&oe=UTF-8&startIndex=&startPage=1 | 2012-05-05T09:31:14 |
| https://www.search.example.com/search?q=oregon+ducks+tickets&rls=com.microsoft:en-us&ie=UTF-8&oe=UTF-8&startIndex=&startPage=1 | 2012-05-05T09:36:44 |
| https://www.search.example.com/search?q=oregon+fanclub&rls=com.microsoft:en-us&ie=UTF-8&oe=UTF-8&startIndex=&startPage=1 | 2012-05-05T09:51:13 |
| https://www.search.example.com/search?q=ducks+tickets&rls=com.microsoft:en-us&ie=UTF-8&oe=UTF-8&startIndex=&startPage=1 | 2012-05-05T09:59:11 |
| https://www.search.example.com/search?q=college+football+news&rls=com.microsoft:en-us&ie=UTF-8&oe=UTF-8&startIndex=&startPage=1 | 2012-05-05T10:11:33 |
| https://www.search.example.com/search?q=SEC+is+overrated&rls=com.microsoft:en-us&ie=UTF-8&oe=UTF-8&startIndex=&startPage=1 | 2012-05-05T10:28:00 |
| https://www.search.example.com/search?q=USC+Trojans&rls=com.microsoft:en-us&ie=UTF-8&oe=UTF-8&startIndex=&startPage=1 | 2012-05-05T10:45:00 |
| https://www.search.example.com/search?q=is+the+PAC-12+the+best+conference?&rls=com.microsoft:en-us&ie=UTF-8&oe=UTF-8&startIndex=&startPage=1 | 2012-05-05T10:59:27 |
| https://www.search.example.com/search?q=rose+bowl+snacks?&rls=com.microsoft:en-us&ie=UTF-8&oe=UTF-8&startIndex=&startPage=1 | 2012-05-05T10:28:00 |

DEFENSE AGAINST SEARCH ENGINE TRACKING

BACKGROUND OF THE INVENTION

The Internet provides vast information resources, such as electronic repositories of information, electronic services, and the like. As a result, people commonly use such information resources as part of their daily lives. Employees of an organization, for example, may visit various websites to obtain information relevant to performance of their duties. A programmer may use the Internet to research various programming tools, techniques, and the like. Others may use the Internet to research various business prospects or to otherwise obtain information in furtherance of one or more business and/or personal goals. One of the most effective ways of obtaining relevant information is to utilize a search engine. Users may enter search queries that are processed by the search engine to provide a list of search results that, according to complex search engine computer systems, have been determined to be relevant to the queries.

While search engines provide a useful tool enabling effective information retrieval, search engines are not without their disadvantages. For example, from the perspectives of the users entering search queries, search engines are usually operated by third parties. As a result, third parties operating search engines are privy to the queries that are made. Further, search engines often collect large amounts of information regarding the queries that were submitted for the purpose of improving their own operations, such as by serving more relevant advertisements, thereby increasing revenue. In some instances, access to information collected by search engines can have adverse consequences. For instance, employees of an organization may be careful about disclosing confidential information, carefully submitting search queries that do not themselves contain anything confidential. However, even if each query itself is innocuous, aggregated information may inadvertently reveal information that was intended to be confidential. For instance, search queries, regarding a particular technology, that originate from a particular organization, may, in aggregate, indicate which tools the organization is using to accomplish certain results. Such information may be intended by the organization to be maintained as a trade secret.

BRIEF SUMMARY OF THE INVENTION

Techniques for enhancing electronic privacy are disclosed herein. In an embodiment, a computer-implemented method for enhancing electronic privacy is disclosed. The method includes obtaining search query information regarding search queries that have been submitted to a search engine computer system by a user computer system of a user; generating, based at least in part on the obtained search query information, noise information; and providing the generated noise information to an application in a manner enabling the application to submit, on behalf of the user, search queries to the search engine that are based at least in part on the provided generated noise information.

Numerous variations of the computer-implemented method of claim 1 are within the scope of the present disclosure. For example, generating the noise information may include, for each search query of at least a subset of the search queries: identifying a keyword of the search query; and determining one or more keywords that are semantically similar to the identified keyword. The noise information may indicate the determined one or more keywords. As another example, obtaining the search query information may include receiving from the user computer system the search query information over a computer network, such as the Internet. The noise information may encode search queries and a schedule for submitting the search queries to the search engine computer system. Providing the generated noise information may enable the user computer system to submit the search queries to the search engine without requiring a specific instruction from the user for each submission of the search queries, in other words, upon receipt of the noise information, no user input may be necessary for the search queries to be submitted to the search engine. Obtained search query information may include information from search results returned by the search engine. For example, the obtained search query information may include information about advertisements that were provided in connection with search results for the search queries that have been submitted to the search engine. Generating the noise information includes extracting information from the advertisements and including the extracted information from the advertisements in the noise information.

In an embodiment, a computer system for enhancing electronic privacy is disclosed. The computer system may include one or more processors; and memory including instructions that, when executed by the one or more processors, cause the computer system to at least: analyze search query information regarding search queries submitted by a user to generate noise information; and cause search queries that are based at least in part on the generated noise information to be submitted to a search engine on behalf of the user.

Generating the noise information may include determining search queries semantically similar or otherwise semantically related to the search queries submitted by the user. Causing the search queries to be submitted to the search engine may include: preparing a schedule for submitting the search queries to be submitted; and providing the prepared schedule to a user computer system of the user. The search query information may include search result information from responses to the search queries submitted by the user and analyzing the search query information to generate the noise information may include generating search terms based at least in part on the search result information. Causing the search queries to be submitted to the search engine may include causing a different computer system to submit the search queries. Causing the search queries to be submitted to the search engine may include causing a different computer system to submit at least one search query to the search engine without user input. Analyzing the search query information to generate noise information includes determining an amount of noise information to generate based at least in part on a number of search queries submitted by the user. In addition, the instructions may further cause the computer system to receive, from a user computing device, the search queries submitted by the user. Causing the search queries to be submitted to the search engine may include providing the generated search queries to the user computing device for automatic submission to the search engine.

In an embodiment, anon-transitory computer-readable storage medium having stored thereon instructions that, when executed by one or more processors of a computer system, cause the computer system to enhance electronic privacy, is disclosed. The instructions may include: instructions that, when executed by the one or more processors, cause the computer system to transmit search query information to a noise-generating computer system; instructions that, when executed by the one or more processors, cause the computer system to receive, from the noise-generating computer system, noise information that was generated based at least in part on the transmitted search query information; and instructions that, when executed by the one or more processors, cause the computer system to transmit, based at least in part on the received noise information, search queries to a search engine computer system that is different from the noise-generating computer system.

The non-transitory computer-readable storage medium may be such that the search query information includes information that is based at least in part on search results to search queries submitted by the computer system. The search query information may include information that is based at least in part on advertisements provided in connection with search results to search queries submitted by the computer system. The search query information may include search terms that have been submitted to the search engine by the computer system. The instructions that cause the computer system to transmit the search queries to the search engine computer system may cause the computer system to transmit the search queries to the search engine computer system without requiring specific user-provided instructions for each search query submission. The noise information includes a search query submission schedule.

BRIEF DESCRIPTION OF THE DRAWINGS

FIG. 7 shows a representation of an illustrative example of a noise schedule prepared in accordance with at least some embodiments.

DETAILED DESCRIPTION OF THE INVENTION

In the following description, for the purposes of explanation, specific details are set forth in order to provide a thorough understanding of embodiments of the invention. However, it will be apparent that the invention may be practiced without these specific details.

The following description describes an embodiment of the present invention in the Internet search domain. However, the scope of the present invention is not restricted to search, but may be applied to other domains or applications. For example, any domain or application where information is submitted to other entities for various purposes may make use of the present invention. Examples of domains in which embodiments of the present invention may be used include any domain where users expressly, or through their interactions with one or more applications, knowingly or unknowingly transmit data to computer systems of other entities.

In general, embodiments of the present invention provide techniques for enhancing electronic privacy when utilizing third-party services. In general, the techniques described and suggested herein relate to, in addition to information submitted to third parties in the normal course of operations, submitting noise information to the third parties to prevent or at least make it more difficult for the third parties to analyze the data they received. Additional data provided to third parties is provided in a manner preventing the third parties from differentiating between the data submitted in the normal course of operations and additional noise data. In addition, the noise data is generated intelligently to prevent against filtering the noise data from other data as a way of third parties circumventing privacy controls.

Figure 1:
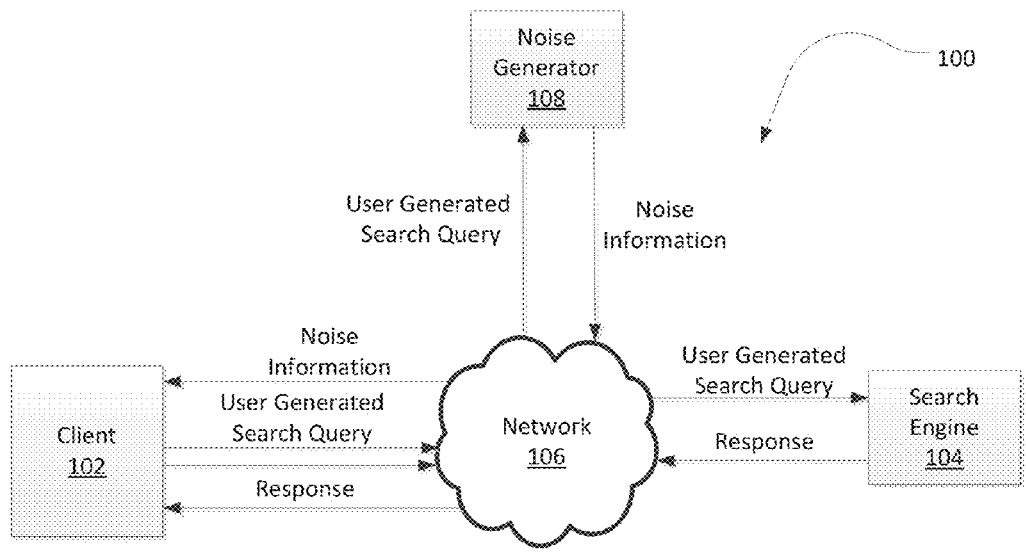
FIG. 1 shows an illustrative example of an environment in which various embodiments may be implemented.

FIG. 1 shows an illustrative example of an environment 100 in which various embodiments of the present disclosure may be implemented. In FIG. 1, a client 102 submits queries to a search engine 104. The client 102 may be a computer system of a user such as a personal computer, notebook or laptop computer, tablet computing device, mobile computing device, and generally any device configured to submit search queries over a communications network. The search engine 104 may be a computer system, which typically comprises numerous subsystems such as server computer systems, data stores, and the like, which is configured to process search queries submitted by various clients, and provide results responsive the queries. In an embodiment, the search engine 104 is able to provide identifiers of documents (such as uniform resource locators (URLs)) among a general corpus of documents such as those documents available over a public communications network such as the Internet. A client provided identifiers of the documents may then select one or more of the identifiers to access corresponding documents(s). However, the search engine 104, in various embodiments, may be any type of search engine including a search engine configured to respond to queries in other ways.

As illustrated in FIG. 1, the client 102 submits a search query generated by a user over a network 106 to the search engine 104. The network 106 may be, for example, the Internet. However, the network 106 may be any suitable communications network such as a mobile communications network, an intranet, and/or generally any combination of communications networks. The user may generate a search query, for instance, by typing or otherwise inputting a search query into a user interface presented to the user on the client 102 which in turn generates an electronic request that is routed through the network 106 to the search engine 104. The search engine 104, in turn, processes the search query, identifies documents responsive to the search query and possibly other content (such as electronic advertisements), and provides the documents and/or other content in a response which is routed through the network 106 to the client 102.

In an embodiment, the response is then processed by the client 102 to be displayed to the user accordingly. It should be noted that, while various embodiments in the disclosure are illustratively described in connection with search queries generated according to users' explicit instructions, the search queries may be generated in various ways. For example, for illustration, a user may type or otherwise input text into a user interface of the client 102 or generate a query in various other ways. For instance, search queries may be generated in response to user navigation of the user interface. The user may, for instance, select a link on a user interface and selection of such link may cause a search query to be generated or accessed from memory and transmitted to a search engine.

Also illustrated FIG. 1, the client 102 may transmit the user search queries to a noise generator 108. A noise generator may be a computer system which, like the search engine 104, may comprise multiple subsystems. The noise generator 108 may be configured to generate noise queries (or information from which noise queries may be generated) in accordance with the various embodiments described herein. For instance, in an embodiment, when a user submits a search query through the network 106 to the search engine 104, the client 102 may also transmit the search query through the network 106 to the noise generator 1108. The client 102 may send the user-generated search query at approximately the same time or a time different from the time the search query is submitted to the search engine 104. In an embodiment, the client 102 submits search queries to the noise generator 108 immediately after (or before) transmitting the search queries to the search engine 104. However, the client 102 may transmit search queries to the noise generator 108 in a batch. The client 102 may be configured, for example, to transmit batches of search queries periodically or at other times.

Additional information may be included with the user-generated search query transmitted to a noise generator 108, such as a user identifier and/or information indicating a time during which the search query was transmitted to the search engine 104. It should be noted that, in embodiments where the client 102 sends search queries to the noise generator 108 at the same time (or approximately the same time) as the queries are submitted to the search engine 104, timing information about the search queries may be excluded since the noise generator may use the time of receipt as a basis for determining when the queries were submitted to the search engine 103. Generally, other applicable information may also be included with the user-generated search query transmitted to the noise generator 108 in various embodiments.

The noise generator 108, in an embodiment, receives the user-generated search queries from the client 102 and generates noise information which is transmitted through the network 106 to the client 102. The noise information may be any information from which the client 102 can generate and submit search queries to the search engine 104. The noise information may encode search queries to be submitted by the client 102 to the search engine 103. The noise information may also include other information, such as information identifying the user (e.g. cookies, login information, and session information) and/or other information that may be provided to a search engine computer system in the normal course of search query submission. As another example, the noise information may encode or otherwise indicate key words, phrases, and/or other information to enable the client 102 to generate and submit search queries to the search engine 104. As described in more detail below, the search queries submitted by the client 102 to the search engine 104 corresponding to the noise information from the noise generator 108 may be related to the queries that the client 102 has submitted to the noise generator 108. The client 102 may use noise information to submit search queries through the network 106 to the search engine 104.

Figure 2:
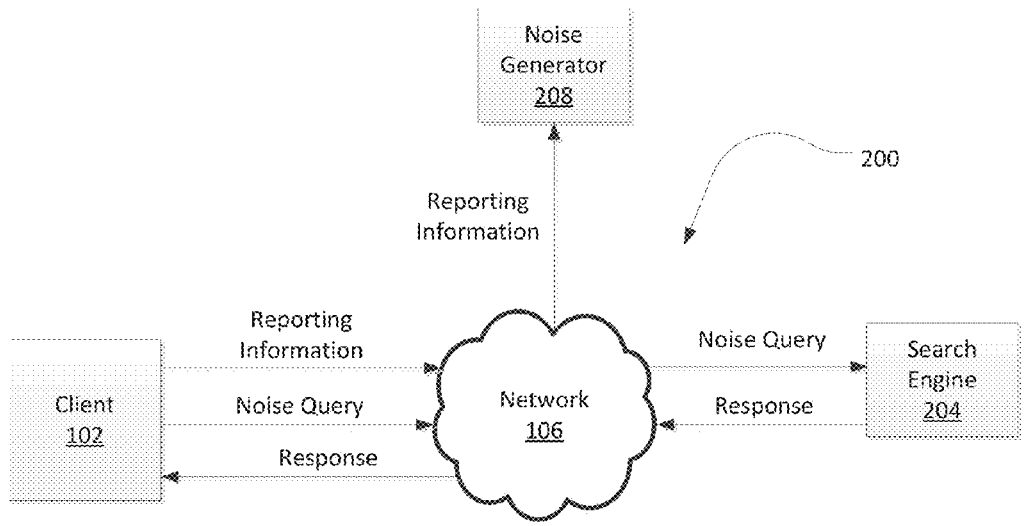
FIG. 2 shows an illustrative example of an environment in which various embodiments may be implemented.

FIG. 2 shows an illustrative example of an environment 200 in which various embodiments may be practiced. In particular, FIG. 2 shows how a client 102 may submit search queries corresponding to noise information to a search engine 204 through a network 206. The client 202, search engine 204 and network 206 may be as described above in connection with FIG. 2. In particular, the client 202, in an embodiment, generates noise queries which may be search queries generated independent of user input. That is, the client 202 generates noise queries automatically without a user specifically providing user input for each noise query. In other words, at least some of the noise queries submitted by the client 202 are submitted without a user having specifically instructed such submission. As illustrated in FIG. 2, the client 202 submits a noise query through the network 206 to the search engine 204 which processes the noise query, typically without knowledge that the noise query is not a typical search query. For example, noise queries may have the same format as typical search queries so as to be indistinguishable from non-noise queries. The search engine may provide a response accordingly through the network 206 to the client 202. While not illustrated as such, the noise query may also be transmitted through the network 206 to a noise generator 208 which may be the same or similar to the noise generator 108 described above in connection with FIG. 1.

Generally, the client 202 may transmit reporting information through the network 206 to the noise generator 208. The reporting information may be any information related to search queries and/or noise queries submitted by the client 202 to the search engine 204 and/or responses to search queries and/or noise queries from the search engine 204 to the client 202. The reporting information may be used by the noise generator 208 for various purposes such as for keeping a record of actions the client 202 has taken and/or other information, such as search responses received by the client 202. As one example, the reporting information may be used to feed a learning model, such as a neural network, that is configured to shape search query noise to match a style of a user's prior queries. It should be noted that, in various embodiments, responses to user-generated search queries may be displayed to the user whereas responses from the search engine of 204 to the client 202 may not be displayed to the user.

In addition, numerous variations to the environments 100, 200 described above in connection with FIGS. 1 and 2 are also considered as being within the scope of the present disclosure. For instance, the environments shown in FIGS. 1 and 2 illustrate a noise generator that is a computer system different from the client. In various other embodiments, noise generators may be components of clients 102. That is, the clients themselves may generate noise queries based at least in part on the queries submitted by the client 102 in accordance with the various embodiments described herein. Other variations are considered to be within the scope of the present disclosure. For instance, FIG. 1 shows a client 102 submitting search queries to both a search engine 104 and a noise generator 108. The noise generator 108 may in other embodiments be a component of a proxy computer system through which search queries from the client 102 are submitted. In such embodiments, a client may submit only one search query to the proxy, which then submits the query to the search engine on behalf of the client as well as generates noise information. In yet other embodiments, the client may communicate search queries to a proxy, which then both transmits the search queries to the search engine and to a noise generator. Responses from the search query, when used in connection with a proxy, may be forwarded from the proxy to the client. Numerous other variations are also considered as being within the scope of the present disclosure, although such embodiments are not necessarily described expressly herein.

Figure 3:
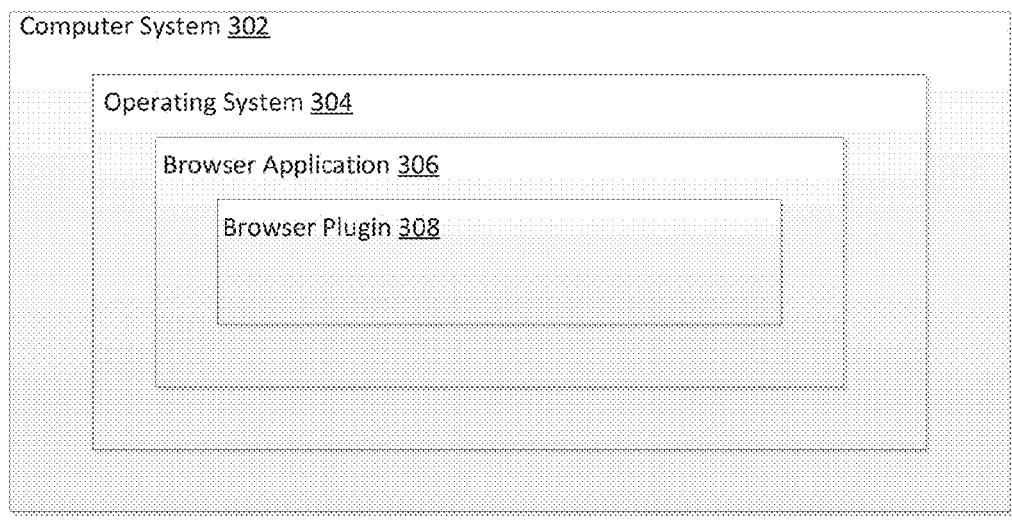
FIG. 3 shows a simplified block diagram of a computer system that may be used to practice various embodiments of the present invention.

As noted, numerous variations are considered as being within the scope of the present disclosure. In one embodiment, a computer system uses a browser plug-in which enables implementation of various embodiments. FIG. 3 accordingly shows a diagrammatic representation 300 of a computer system which may be used to implement various embodiments of the present disclosure. As shown in FIG. 3, the diagram 300 illustrates a computer system 302, which may be a computer system such as that described below in connection with FIG. 10. The computer system 302 may have an operating system 304 such as a Windows-based operating system, a Linux-based operating system, a MAC operating system, an Android operating system, or, generally, any suitable operating system. The operating system 304 may support the execution of one or more applications, such as a browser application 306. A browser application may be an application through which content is accessed and displayed and/or otherwise presented to a user. For example, browser applications include Windows Internet Explorer, Google Chrome, Firefox, and Safari.

In various embodiments, the browser application includes a browser 308, which enables implementation of various embodiments of the present disclosure. For example, referring to FIG. 1, the browser plug-in may detect search queries submitted to common search engines, such as Google and Bing, and, as a result, transmit search queries to a noise generator 108. Similarly, the browser plug-in 308 may utilize noise information provided from a noise generator and generate noise queries, which are then transmitted to a search engine. Similarly, a browser plug-in may be configured to transmit reporting information and generally any information transmitted in accordance with implementation of the various embodiments described herein. Operation of the plug-in 308 may be transparent to the user, that is, the plug-in may operate with little or no visibility to the user.

Figure 4:
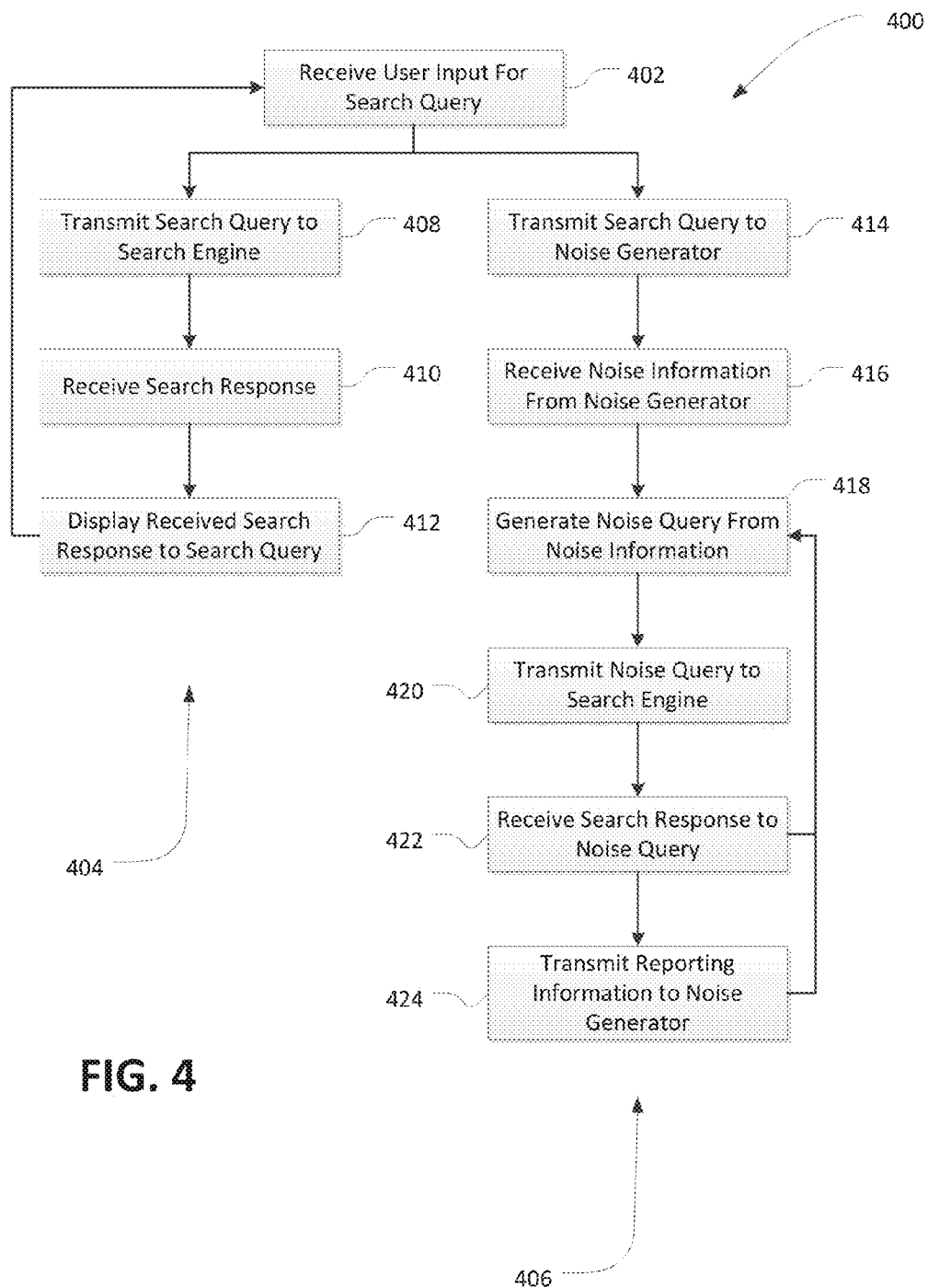
FIG. 4 shows a flowchart for an illustrative example of a process for submitting search queries in accordance with at least one embodiment.

FIG. 4 shows an illustrative example of a process 400 for implementing various embodiments of the present disclosure. The process 400 may be performed, for example, by a browser plug-in such as that described above in connection with FIG. 3 or generally by a client computer system or proxy computer system, depending on the various embodiments being implemented. Some or all of the process 400 (or any other processes described herein, or variations and/or combinations thereof) may be performed under the control of one or more computer systems configured with executable instructions and may be implemented as code executable instructions, one or more computer programs, or one or more applications) executing collectively on one or more processors, by hardware, or combinations thereof. One or more of the actions depicted in FIG. 4 may be performed by a device such as a client computing device, such as described above. The code may be stored on a computer-readable storage medium, for example, in the form of a computer program comprising a plurality of instructions executable by one or more processors. The computer-readable storage medium may be non-transitory.

In an embodiment, the process 400 includes receiving 402 user input for a search query. As described above, the user may type or otherwise input text as a search query or may otherwise provide user input into an application where the input is usable to generate a search query. As illustrated in FIG. 4, the process 400 includes two separate tasks which, while illustrated as performed in parallel, may also be performed in sequence. The first task 404, in this illustration, is related to submission of the search query to a search engine whereas a second task 406 is related to interaction with a noise generator such as that described above. As noted, the tasks 404, 406 may be performed in parallel or in sequence. If in sequence, the task 406 may be performed as part of a batch process for generating aggregated information to a noise generator.

Turning to the task 404, in an embodiment, the process 44 includes transmitting 408 the search query to a search engine. As described above, the search engine may provide a response to the search query, which is then received 410. The received response is displayed or otherwise presented 412 to the user. Turning to the task 406, in one embodiment, the process 400 includes transmitting 414 the search query to a noise generator. As described above, the search query may be transmitted at approximately the same time as the time at which the search queries transmit[?] to the search engine or at a different time, which may be as part of a batch process for transmitting search queries to the noise generator. As described above, a noise generator may use the transmitted search query to generate noise information, which is then received 416 from the noise generator. The noise information may then be used to generate 418 one or more noise queries from the noise information. Noise information, as discussed above, may include the queries or information from which the queries can be determined. Search queries may be then transmitted 420 to the search engine. It should be noted that a period of time may pass between the time that the noise information is generated and the noise query is transmitted to the search engine, which may be as described in more detail below. A search response to the noise query may be received 422 from the search engine. However, as noted, because a user did not specifically request the noise query, the response to the noise query may be ignored. That is, while it may be received by a user computer system, the response may not be presented to the user. Noise information may be then transmitted 424 to a noise generator such as described above. It should be noted that, while illustrated as a step occurring after the search response to the noise query is received 422, the noise information may be transmitted at a different time. For instance, reporting information may be aggregated and provided in a batch.

Figure 5:
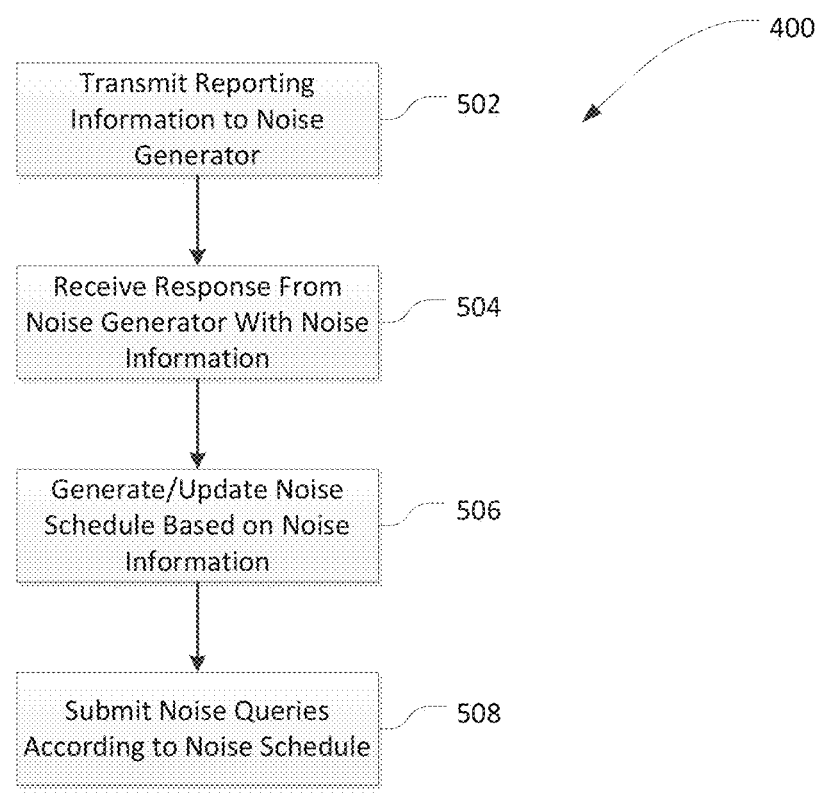
FIG. 5 shows a flowchart for an illustrative example of a process for submitting search queries in accordance with at least one embodiment.

FIG. 5 shows an illustrative example of a process 500 which may be used to submit noise queries. The process 500 may be performed by a client device or any device acting on behalf of a user, such as a proxy device. In an embodiment, the process 500 includes transmitting 502 reporting information to a noise generator. As discussed above, the reporting information may be information regarding queries that have been submitted to a search engine and may include responses received in response to the queries. In an embodiment, the noise generator utilizes reporting information to generate noise information, which may be information such as described above. Accordingly, the process 500, in an embodiment, includes receiving 504 a response from a noise generator with noise information.

In an embodiment, the process 500 includes generating and/or updating a noise schedule based at least in part on the noise information that has been received. A noise schedule may be information from which noise may be generated and transmitted to a search engine over a period of time. The noise schedule may, for instance, include information that encodes search queries to be transmitted and a time at which the search queries should be submitted. Generating the noise schedule may also be performed so that various conditions are met. For example, the noise schedule may be generated to avoid or entirely omit duplicate queries, in addition, the noise schedule may be generated so that queries are submitted irregularly, that is, at irregular time periods. Generally, conditions may be enforced during generation of the noise schedule (or at another time by a different device) to ensure that real search queries (i.e. non-noise queries) and noise-queries are effectively indistinguishable from one another. In other words, noise queries may be generated and/or submitted so that a search engine or other system is unable to effectively distinguish between noise queries and real, search queries. Accordingly, as illustrated in FIG. 5, the process 500 includes submitting 508 noise queries according to the generated and/or updated noise schedule. A browser plug-in or other application may, for instance, process the noise schedule and cause transmission of queries according to the schedule. An example noise schedule appears below in connection with FIG. 7.

Figure 6:
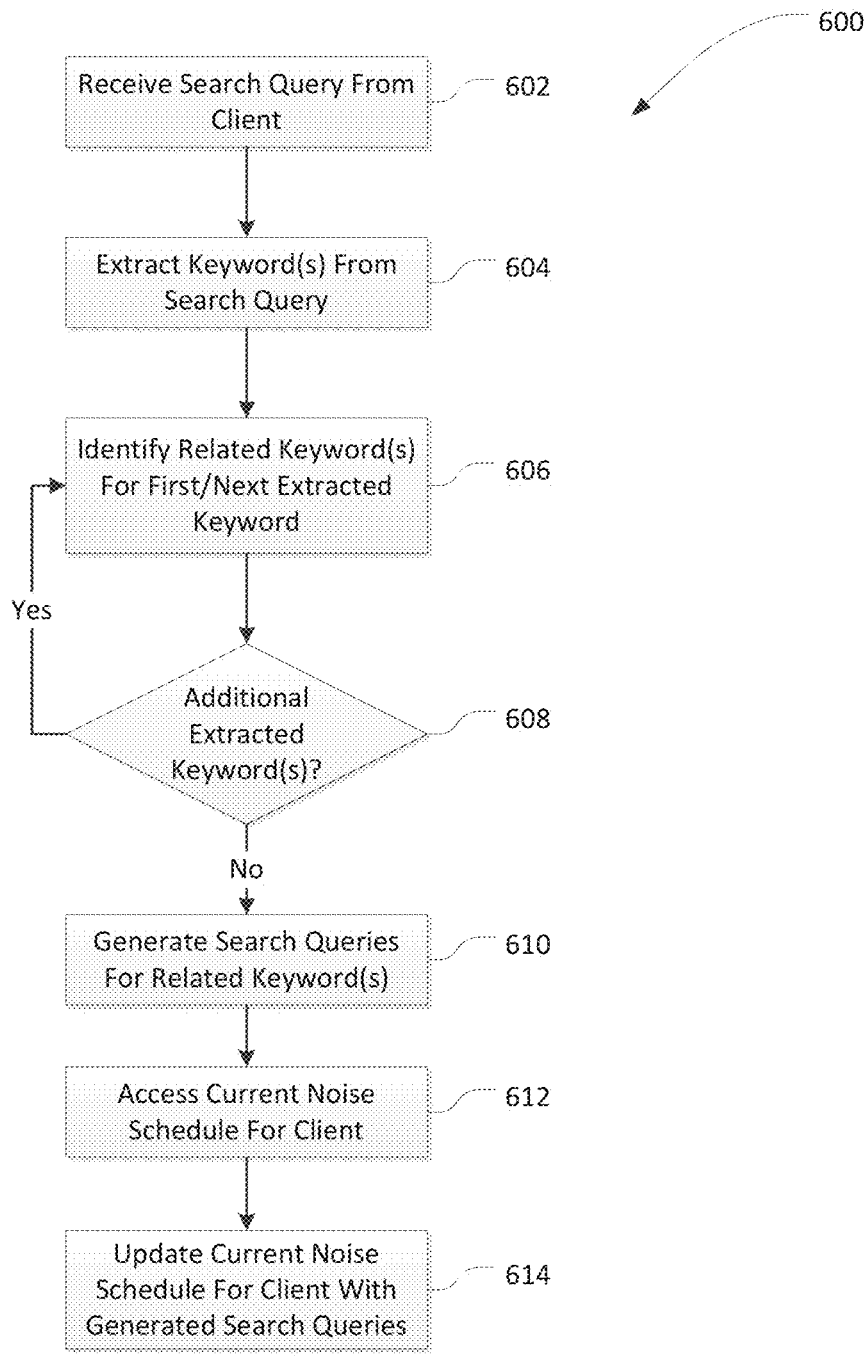
FIG. 6 shows a flowchart for an illustrative example of a process for generating search query noise in accordance with at least one embodiment.

FIG. 6 shows an illustrative example of how noise queries may be generated from noise information in accordance with various embodiments. FIG. 6 shows a process that may be performed, for instance, by a noise generator computer system or another computer system, such as a client computer system. The process 600, as illustrated, includes receiving 602 a search query from a client. One or more key words may be extracted 604 from the search query. Extracting key words from the search query may be performed in any suitable manner. For instance, a query may be parsed and divided into words of a language in which the search query was submitted. Extracting the key words from the search query may also include other processing such as stemming and/or removal of noise words, that is, words which are generally in substantial portions of search queries. For example, noise words include articles "a," "an," and "the," and other insignificant terms such as "and," "of," and others.

In an embodiment, the process 600 includes identifying 606 related key words for the first extracted key word. Identifying related key words may be performed in any suitable manner. For instance, related key words may be key words that are determined to be semantically similar to the extracted key word. As an illustrative example, if the key word is a trademark for a car manufacturer, a related key word may be a trademark for another car manufacturer. The related key word may also be determined to be not only a trademark for another car manufacturer, but a trademark corresponding to a car in the same class of car. As an example, if the extracted key word was "BMW," the identified key word may be "Mercedes." Identifying words semantically similar to another word may be performed in any suitable way. For example, a database may be maintained that associates words with semantically similar and/or otherwise related words. Semantic similarity and/or relatedness may be determined in any suitable way, such as by using an electronic tool, such as WordNet, available from Princeton University or an electronic thesaurus. Generally, any tool that allows input of one term or phrase and outputs a semantically similar term or phrase may be used. As another example, as discussed more below, semantically similar terms may be identified by extracting information from advertisements returned by search engines in response to queries.

In an embodiment, the process 600 includes determining 608 whether there are additional extracted keywords and, if there are, related words for the next extracted key word are identified 606 and a determination of whether there are additional extracted key words may again be made 608 until it is determined 608 that there are no additional extracted key words to process. When it is determined that there are no additional extracted key words, one or more search queries may be generated 610 for the related key words that have been identified. A current noise schedule for a client may be accessed 612, or, if one does not exist, one may be generated. The accessed noise schedule may be updated 614 for the client with the generated search queries. While the process 600 is described, generally, as extracting terms from a query and using semantically similar terms in their place, other techniques are also considered as being within the scope of the present disclosure. For example, a query may be considered as a phrase or sentence and the process may be modified to identify a semantically similar phrase or sentence.

As mentioned below, FIG. 7 shows an illustrated example of a noise schedule for a client in accordance with an embodiment. In the illustrative example of FIG. 7, the noise schedule is encoded as a table having a column whose entries correspond to search queries and another column whose entries correspond to execution times for the search queries. It should be noted, however, that any suitable way of including such information may be used and that the encoding does not necessarily need to take a table form. The table illustrated in FIG. 7 includes queries that may have been generated due to a user having submitted queries relating to the Oregon Ducks. The user may for instance be a fan of the college football team of the University of Oregon. Accordingly, the search queries encoded in the search query column of the noise schedule of FIG. 7 are queries that are semantically similar to queries submitted in connection with the Oregon Ducks. For instance, the first entry in the search query column is the search query for the terms "Oregon" and "Ducks," along with other information that indicates, according to a format acceptable to the search engine, other information, such as a coding scheme and browser used by the client and other information. Other queries may have been generated using semantically related terms. For example, one of the queries includes the terms "college" and "football" and "news." As another example, one of the queries includes "Oregon" and "State" and "Beavers." As yet another example, one of the queries includes the phrase "SEC is overrated." Thus, while all of these queries are related to college football, the queries diverge from the main subject of the queries, therefore obscuring any analysis of a set of queries that includes the users' actual queries and queries submitted from the table 700.

In various embodiments, information received from a search engine may be utilized to improve noise information which is generated. In particular, search engines typically use complicated algorithms to not only find results that are relevant to the search queries, but to provide targeted advertising along with responses to the search queries. Accordingly, various embodiments of the present disclosure include leveraging such information.

Figure 8:
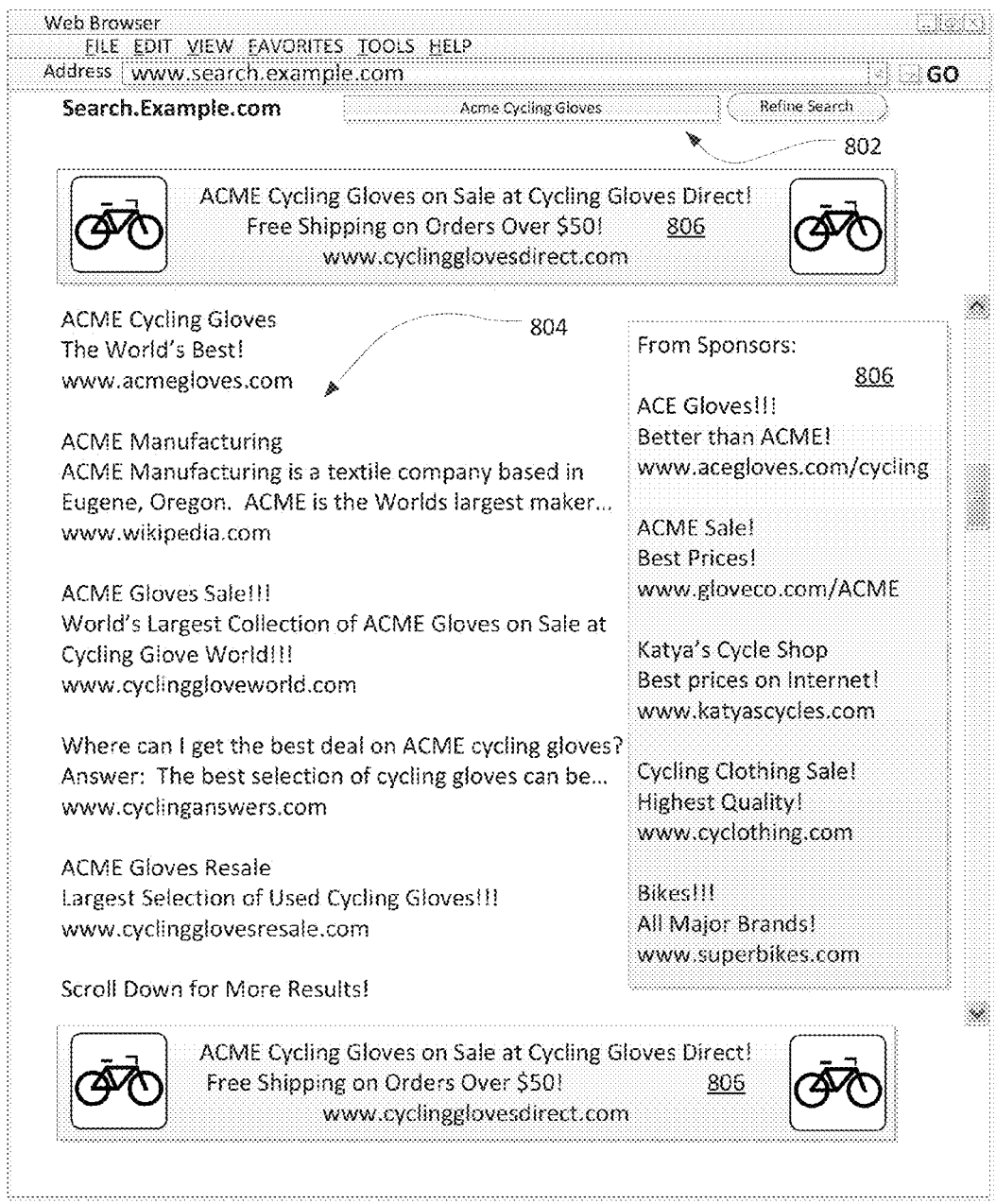
FIG. 8 shows an illustrative example of a web page with search results in accordance with at least one embodiment.

FIG. 8, accordingly, shows an illustrative example of a browser interface 800 containing a search result which may include information that may be used to improve noise information for generating noise queries. The browser interface 800 in an embodiment includes various user interface elements through which the user may interact. For instance, the browser interface 800 includes a search element 802 in which the user may enter a search query. In the illustrative example of FIG. 2, the user has entered a search query for "Acme cycling gloves," and a result 804 has been provided accordingly.

In an embodiment, the result includes information corresponding to various websites which a search engine has determined to be relevant to the submitted search query. Thus, in this example, various web pages determined to be relevant to Acme cycling gloves are provided in the search result 804. In addition, the browser interface displays numerous advertisements 806 in various locations along the page. Each of the advertisements 806 includes information intended to entice the user to select the advertisement so that the search engine may derive revenue accordingly. The advertisements, for example, include numerous data which may be provided by advertisers and which is used by the search engine in order to determine what is relevant to the search query. For example, advertisements include titles, textual descriptions, and hyperlinks. Some or all of such information may be extracted and provided with reporting information going to a noise generator. Words may be extracted from these advertisements and used to generate noise queries. For instance, looking at the illustrative example shown in FIG. 8, an advertisement for Ace gloves is provided in an advertisement that was provided with a search result to the search query for Acme cycling gloves. Thus, the search engine has determined that Ace gloves is semantically related to Acme gloves. Thus, a noise generator may submit a noise query for Ace gloves or something similar.

Figure 9:
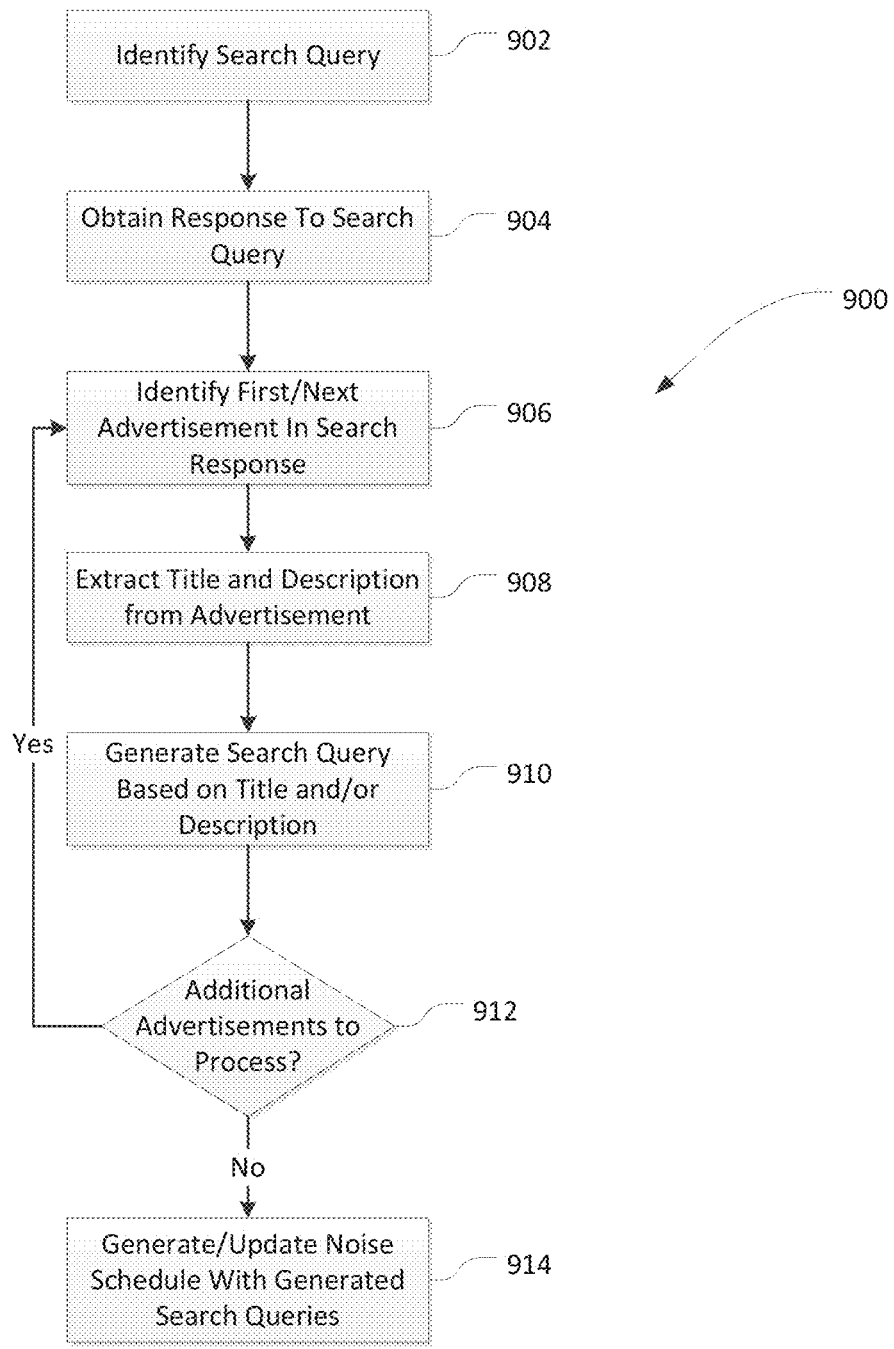
FIG. 9 shows a flowchart for an illustrative example of a process for generating search query noise in accordance with at least one embodiment.

FIG. 9 shows an illustrative example of a process 900 which may be used to generate noise information using search responses. In an embodiment, the process 900 includes identifying 902 a search query. A search query may be identified in any suitable manner, such as by receipt from a client system or access from memory. As described above, a response to the search query may be obtained 904. For instance, the response or information derived therefrom may be provided from a client to a noise generator or, in the example of a noise generator acting as a proxy for the client, the noise generator may obtain the response itself.

In this illustrative example, the process 900 includes identifying 906, the first advertisement in a search response. It should be noted that, "first" in this context is not necessarily the first appearing on the page, but may be the first accessed by a computer system performing the process 900. A title and description from the advertisement and/or possibly additional information may be extracted 908 from the advertisement. A search query may be generated 910 based on the title and/or description. The search query may be, for example, exactly the title and description, or may be a search query that is derived from the title and/or description. For example, referring to the illustrative example of FIG. 8, a search query for Ace may be derived from the advertisement for Ace gloves.

A determination may be made 912 whether there are additional advertisements to process. A determination may be made in various ways. For example, if there are no advertisements from the search response, the determination may be that there are no additional advertisements to process. In some embodiments, only the first few advertisements of an ordered set of advertisements are useful because advertisements are typically ranked according to relevance and lower ranked advertisements may be less relevant and less prominently displayed because of their tower likelihood of revenue generation for the search engine. Accordingly, determining whether there are additional advertisements to process may include determining whether some number of advertisements processed has been reached. If it is determined that there are additional advertisements to process, the next advertisement may be identified 906 and the title/description may be extracted 908 and used to generate a search query such as described above. If it is determined that there are no additional advertisements to process, a noise schedule with the generated search queries may be generated and/or updated.

It should be noted that, as with all processes described herein, variations of the process 900 are considered as being within the scope of the present disclosure. For example, FIG. 9 shows generating or updating a noise schedule occurring as a separate step after it is determined there are no additional advertisements to process. However, a noise schedule may be updated with each search query that is generated. That is, the noise schedule may be incrementally updated as a process 900 is performed. Generally, other variations are considered as being within the scope of the present disclosure and it will be understood by those with skill in the art that various actions illustrated in the figures are not always necessarily performed as illustrated.

Figure 10:
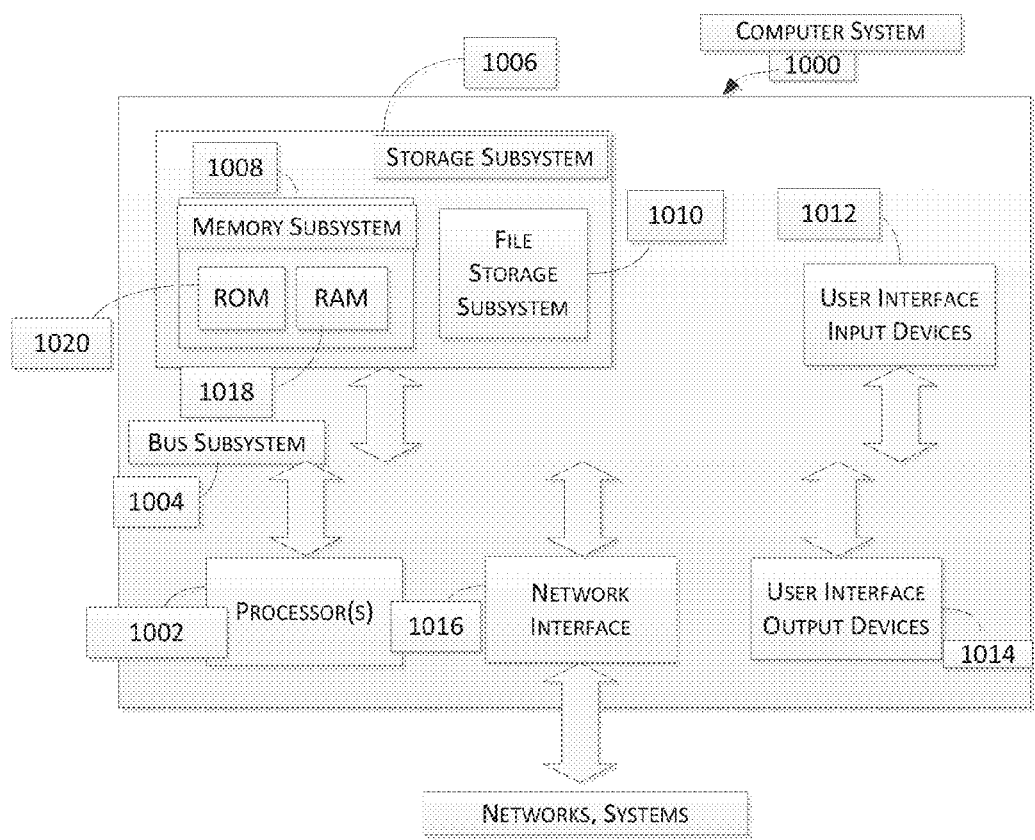
FIG. 10 shows a simplified block diagram of a computer system that may be used to practice an embodiment of the present invention.

FIG. 10 is a simplified block diagram of a computer system 1000 that may be used to practice an embodiment of the present invention. Computer system 1000 may serve as a client computing device, search engine computing device, noise generating computer device, or other processing system. As shown in FIG. 10, computer system 1000 includes a processor 1002 that communicates with a number of peripheral subsystems via a bus subsystem 1004. These peripheral subsystems may include a storage subsystem 1006, comprising a memory subsystem 1008 and a file storage subsystem 1010, user interface input devices 1012, user interface output devices 1014, and a network interface subsystem 1016.

Bus subsystem 1004 provides a mechanism for letting the various components and subsystems of computer system 1000 communicate with each other as intended. Although bus subsystem 1004 is shown schematically as a single bus, alternative embodiments of the bus subsystem may utilize multiple busses.

Network interface subsystem 1016 provides an interface to other computer systems, networks, and portals. Network interface subsystem 1016 serves as an interface for receiving data from and transmitting data to other systems from computer system 1000.

User interface input devices 1012 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms tier inputting information to computer system 1000. A user may use an input device to provide a search query. It should be noted that the computer system 1000 may operate without an user interface input device. For example, if used to implement a server computer system, the computer system 1000 may lack a user interface input device during much or even all of its operation.

User interface output devices 1014 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1000. Results of executing search queries may be output to the user via an output device, for example. Further, as with user input devices, computer system 1000 may lack an output device, depending on its role. For example, server computer systems may lack output devices.

Storage subsystem 1006 provides a computer-readable medium for storing the basic programming and data constructs that provide the functionality of the present invention. Software (programs, code modules, instructions) that when executed by a processor provide the functionality of the present invention may be stored in storage subsystem 1006. These software modules or instructions may be executed by processor(s) 1002. Storage subsystem 1006 may also provide a repository for storing data used in accordance with the present invention, for example, the storage subsystem may include some or all of a search engine index. Storage subsystem 1006 may comprise memory subsystem 1008 and file/disk storage subsystem 1010.

Memory subsystem 1008 may include a number of memories including a main random access memory (RAM) 1018 for storage of instructions and data during program execution and a read-only memory (ROM) 1020 in which fixed instructions are stored. File storage subsystem 1010 provides persistent (non-volatile) storage for program and data files, and may include a hard disk drive, a floppy disk drive along with associated removable media, a Compact Disk Read-Only Memory (CD-ROM) drive, an optical drive, removable media cartridges, and other like storage media.

Computer system 1000 can be of various types including a personal computer, a portable computer, a tablet computer, a workstation, a network computer, a mainframe, a kiosk, a server or any other data processing system. Computer system 1000 may also be a component of a larger computer system that comprises multiple computer systems collectively configured to operate in accordance with various embodiments of the present disclosure. Due to the ever-changing nature of computers and networks, the description of computer system 1000 depicted in FIG. 10 is intended only as a specific example for purposes of illustrating the preferred embodiment of the computer system. Many other configurations having more or fewer components than the system depicted in FIG. 10 are possible.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A computer-implemented method for enhancing electronic privacy, comprising:
   receiving, at a user computer system, a first query submitted by a user of the user computer system to a search engine;
   obtaining, at the user computer system, a first query response corresponding to the first query;
   receiving, by the user computer system, information that identifies at least one of the user or the first query, based at least in part on the first query response;
   generating, by the user computer system, one or more additional queries based at least in part on the information;
   generating, by the user computer system, based at least in part on the information, a schedule comprising the one or more additional queries with corresponding execution times;
   transmitting, by the user computer system, the one or more additional queries to the search engine in accordance with the schedule;
   receiving, by the user computer system, a second query response from the search engine based at least in part on the schedule;
   identifying, by the user computer system, an advertisement in the second query response;
   identifying, by the user computer system, information related to the advertisement;
   generating, by the user computer system, a third query based at least in part on the identified information in the advertisement; and
   adding the third query to the schedule with a corresponding execution time.

2. The computer-implemented method of claim 1, wherein generating the information includes, for each first query of at least a subset of the first queries:
   identifying a keyword of the first query; and
   determining one or more keywords that are semantically similar to the identified keyword; and
   wherein the information indicates the determined one or more keywords.

3. The computer-implemented method of claim 1, wherein the schedule further comprises information related to the one or more additional queries and the execution times corresponding to the one or more additional queries.

4. The computer-implemented method of claim 1, further comprising automatically generating, by the user computer system, the one or more additional queries without requiring a specific instruction from the user.

5. A computer system, comprising:
   one or more processors; and
   memory including instructions that, when executed by the one or more processors, cause the computer system to at least:
   analyze a first query response, corresponding to a first query that has been submitted by a user, to generate information that identifies at least one of the user or the first query;
   cause one or more additional queries to be generated based at least in part on the information;
   cause a schedule to be generated based at least in part on the information, the schedule comprising the one or more additional queries with corresponding execution times;
   cause the one or more additional queries to be transmitted to the search engine in accordance with the schedule;
   cause a second query response to be received from the search engine based at least in part on the schedule;
   cause an advertisement to be identified in the second query response;
   cause information related to the advertisement to be identified;
   cause a third query to be generated based at least in part on the identified information in the advertisement; and
   cause the third query to be added to the schedule with a corresponding execution time.

6. The computer system of claim 5, wherein generating the information includes determining search queries semantically similar to the first query submitted by the user.

7. The computer system of claim 5, wherein causing the one or more additional queries to be submitted to the search engine includes:
   preparing the schedule for submitting the one or more additional queries to be submitted; and
   providing the prepared schedule to a user computer system of the user.

8. The computer system of claim 5, wherein:
the first query response includes search result information from responses to the first query submitted by the user; and
wherein analyzing the first query response to generate the information includes generating search terms based at least in part on the search result information.

9. The computer system of claim 5, wherein causing the one or more additional queries to be submitted to the search engine includes causing a different computer system to submit the one or more additional queries.

10. The computer system of claim 5, wherein causing the one or more additional queries to be submitted to the search engine includes causing a different computer system to submit at least one additional query to the search engine without user input.

11. The computer system of claim 5, wherein analyzing the first query response to generate information includes determining an amount of information to generate based at least in part on a number of search queries submitted by the user.

12. The computer system of claim 5, wherein:
the instructions further cause the computer system to receive, from a user computing device, the first query submitted by the user; and
causing the one or more additional queries to be submitted to the search engine includes providing the generated one or more additional queries to the user computing device for automatic submission to the search engine.

13. A non-transitory computer-readable storage medium having stored thereon instructions that, when executed by one or more processors of a first computer system, cause the first computer system to enhance electronic privacy, the instructions including:
instructions that, when executed by the one or more processors, cause the first computer system to transmit a first query response corresponding to a first query to a second computer system;
instructions that, when executed by the one or more processors, cause the first computer system to receive, from the second computer system, information that identifies at least one of the user or the first query that was generated based at least in part on the first query response corresponding to the first query;
instructions that, when executed by the one or more processors, cause the first computer system to generate, based at least in part on the received information, one or more additional queries;
instructions that, when executed by the one or more processors, cause the first computer system to generate, based at least in part on the information, a schedule comprising the one or more additional queries with corresponding execution times;
instructions that, when executed by the one or more processors, cause the first computer system to transmit the one or more additional queries to the search engine computer system in accordance with the schedule;
instructions that, when executed by the one or more processors, cause the first computer system to receive a second query response from the search engine computer system based at least in part on the schedule;
instructions that, when executed by the one or more processors, cause the first computer system to identify an advertisement in the second query response;
instructions that, when executed by the one or more processors, cause the first computer system to identify information related to the advertisement;
instructions that, when executed by the one or more processors, cause the first computer system to generate third query based at least in part on the identified information in the advertisement; and
instructions that, when executed by the one or more processors, cause the first computer system to add the third query to the schedule with a corresponding execution time.

14. The non-transitory computer-readable storage medium of claim 13, wherein the first query response includes information that is based at least in part on search results to search queries submitted by the computer system.

15. The non-transitory computer-readable storage medium of claim 13, wherein the second query response includes information that is based at least in part on advertisements provided in connection with search results to the first query submitted by the first computer system.

16. The non-transitory computer-readable storage medium of claim 13, wherein the first query includes search terms that have been submitted to the search engine computer system by the first computer system.

17. The non-transitory computer-readable storage medium of claim 13, wherein the instructions that cause the first computer system to transmit the one or more additional queries to the search engine computer system cause the first computer system to transmit the one or more additional queries to the search engine computer system without requiring specific user-provided instructions for each search query submission.

18. The non-transitory computer-readable storage medium of claim 13, wherein the information includes a search query submission schedule.

* * * * *